United States Patent [19]
Stump et al.

[11] Patent Number: 5,119,935
[45] Date of Patent: Jun. 9, 1992

[54] VTOL AIRCRAFT CONVERTIBLE SHIPPING CONTAINER AND METHOD OF USE

[75] Inventors: Joseph W. Stump, Smithtown; Robert W. Kress, Saugerties, both of N.Y.; Robert C. Powers, Virginia Beach, Va.

[73] Assignee: Grumman Aerospace Corporation, Bethpage, N.Y.

[21] Appl. No.: 647,347

[22] Filed: Jan. 29, 1991

[51] Int. Cl.$^5$ .................. B65D 85/68; B65D 6/22; B64C 7/00
[52] U.S. Cl. .................. 206/335; 52/64; 220/4.28; 220/6; 244/1 R
[58] Field of Search .................. 206/335; 52/64, 71; 244/1 R; 220/4.28, 6, 1.5

[56] References Cited

U.S. PATENT DOCUMENTS

| | | | |
|---|---|---|---|
| 2,342,264 | 2/1944 | Fuehrer | 52/64 |
| 2,360,220 | 10/1944 | Goldman | 206/335 X |
| 2,482,918 | 9/1949 | Kump, Jr. | 52/64 |
| 3,708,200 | 1/1973 | Richards | 52/64 X |

FOREIGN PATENT DOCUMENTS 0034893 3/1977 Japan .................. 206/335

Primary Examiner—Bryon P. Gehman
Attorney, Agent, or Firm—Pollock, VandeSande & Priddy

[57] ABSTRACT

A metal container stores a VTOL aircraft during shipment to a sea vessel or large vehicle where it then functions as a portable weather-tight hangar which can be secured in available deck space. When on board a ship's deck, the walls of the container unfold so that the structure may be converted to a take-off and landing pad that provides an exhaust system for the hot lift engine gases that eliminates the hazard to ship's crew, prevents heat damage to the deck and eliminates "suck down" effects characteristic of certain VTOL aircraft configurations. Triangular panels are removably secured together to form the cover of the container; and when unfolded and flattened, these panels are inserted in the corners of the unfolded structure so as to extend the heat shield.

4 Claims, 3 Drawing Sheets

VTOL AIRCRAFT CONVERTIBLE SHIPPING CONTAINER AND METHOD OF USE

FIELD OF THE INVENTION

The present invention relates to portable crating systems for transporting aircraft, and more particularly to such a crating system that is delivered to a ship or vehicle where it is used as a weather-tight storage container for the aircraft and its support equipment. The container would also unfold on the deck of the ship to exhaust hot exhaust gases from a vertical take-off lift engine to reduce hazard to personnel and damage to the deck. In the unfolded configuration it acts as a launch platform; and by incorporation of a wire mesh landing surface, it catches and secures the aircraft to the deck upon touch down.

BACKGROUND OF THE INVENTION

VTOL aircraft may be based on several classes of ships or aboard vehicles. Since these aircraft utilize vertically oriented jet engines for vertical take-off, they exhaust heated gases at elevated temperatures. These high temperatures can be a hazard to nearby personnel and can cause damage to the deck of a ship. Accordingly, means must be found to either retrofit a ship with heat-resistant launch and recovery platform or auxiliary heat-resistant plates must be placed over the deck. The aircraft with a vertically vectored thrust lift engine, if in close proximity to the deck, can experience a phenomenon called "suck down" which reduces significantly the lifting effects of the engine. The container of the invention includes an exhaust that is part of the unfolded container which mitigates that effect.

A separate problem concerns the crating of VTOL aircraft for shipment from a land-based site to the ship. This can be done in a crate, after outer wing portions of the aircraft are either folded or removed and stored in the crate. Of course, once the aircraft is delivered on board ship, there is the problem of storing the aircraft and protecting it from damage by sea, storm, accident, sabotage, or enemy attack. Separate adequate hangar facilities would therefore be necessary.

BRIEF DESCRIPTION OF THE PRESENT INVENTION

The present invention is highly advantageous for ensuring proper deployment and use of VTOL aircraft in that it provides a crating system that may be used to safely transport an aircraft on board ship or large vehicles while being convertible thereafter to a flat structure which may rest upon a ship deck and which may act as a heat shield, jet engine exhaust system and VTOL take-off and landing pad. The container system is portable and is designed to be easily moved by cargo-handling cranes and vehicles.

As a result of the present invention, there is no separate hangar requirement aboard ship since the portable crate can be refolded and secured out on the deck, as a small hangar, with the aircraft inside and protected from the outside environment. The crate can then be unfolded, the support equipment removed, the aircraft wings mounted to the fuselage. The unfolded crate then provides the ideal take-off and landing platform. This eliminates the need to use ship's hangar space normally allocated to the ship's helicopter and avoids the necessity of retrofitting a deck with high-temperature-resistant materials or providing separate heat-resistant plates on board the ship deck.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1A:
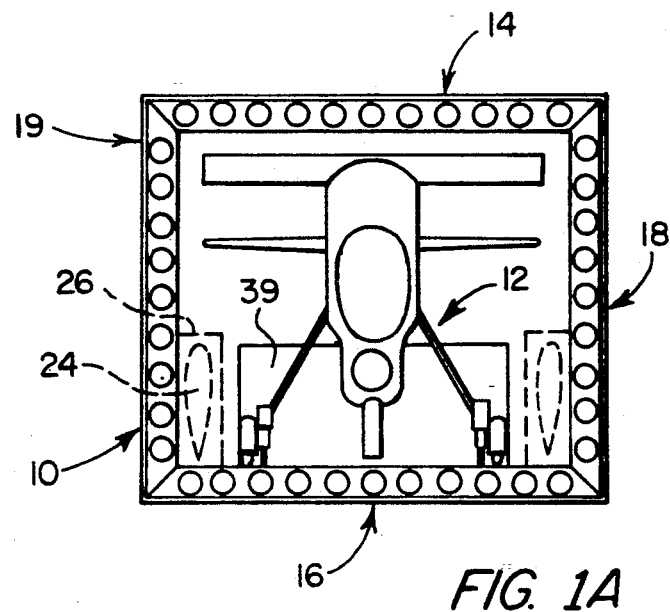
FIG. 1A is an end elevational view illustrating a contained VTOL therein.
Figure 1B:
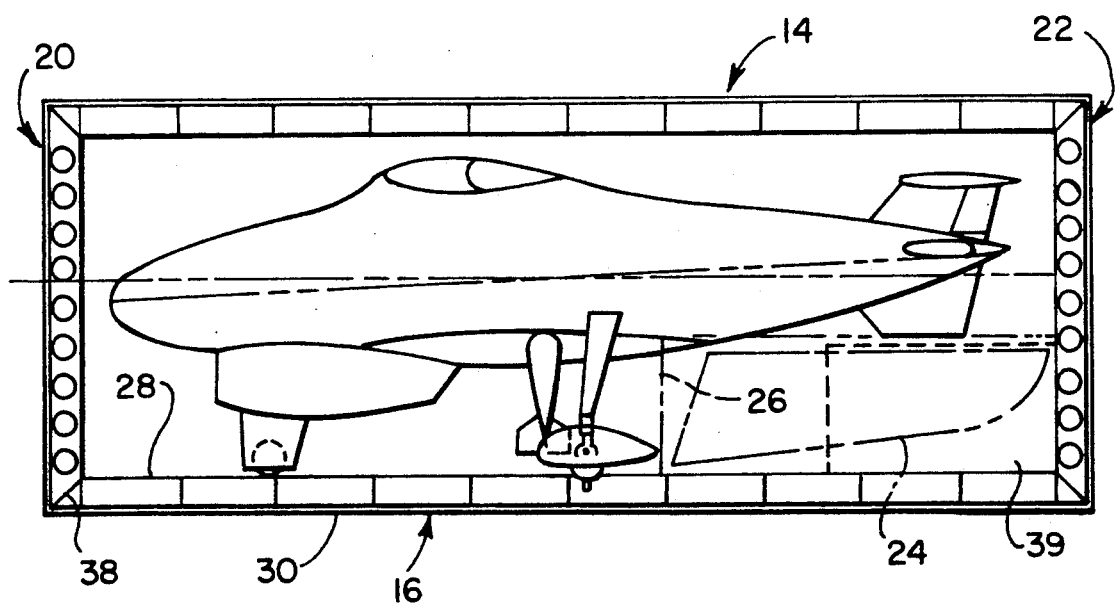
FIG. 1B is a side elevational view illustrating a contained VTOL therein.

Referring to the figures, and more particularly FIGS. 1A and 1B, reference numeral 10 generally indicates the convertible container of the present invention.

A VTOL aircraft 12 is stored within the container during shipping after the outer wing panels 24 have been removed and stored in boxes 26 located within the container 10. Space 39 can be used to secure and store spare parts and support equipment during transit and when not in use aboard ship. The container can also be secured in available space on the ship's deck to function as a portable hangar to protect the aircraft and its support equipment against the environment. The container includes a cover 14, base 16, side walls 18 and 19, as well as front and rear walls 20 and 22. Each of the walls of the containers includes two layers, such as illustrated by reference numerals 28 and 30 for the base 16.

Figures 3, 4:
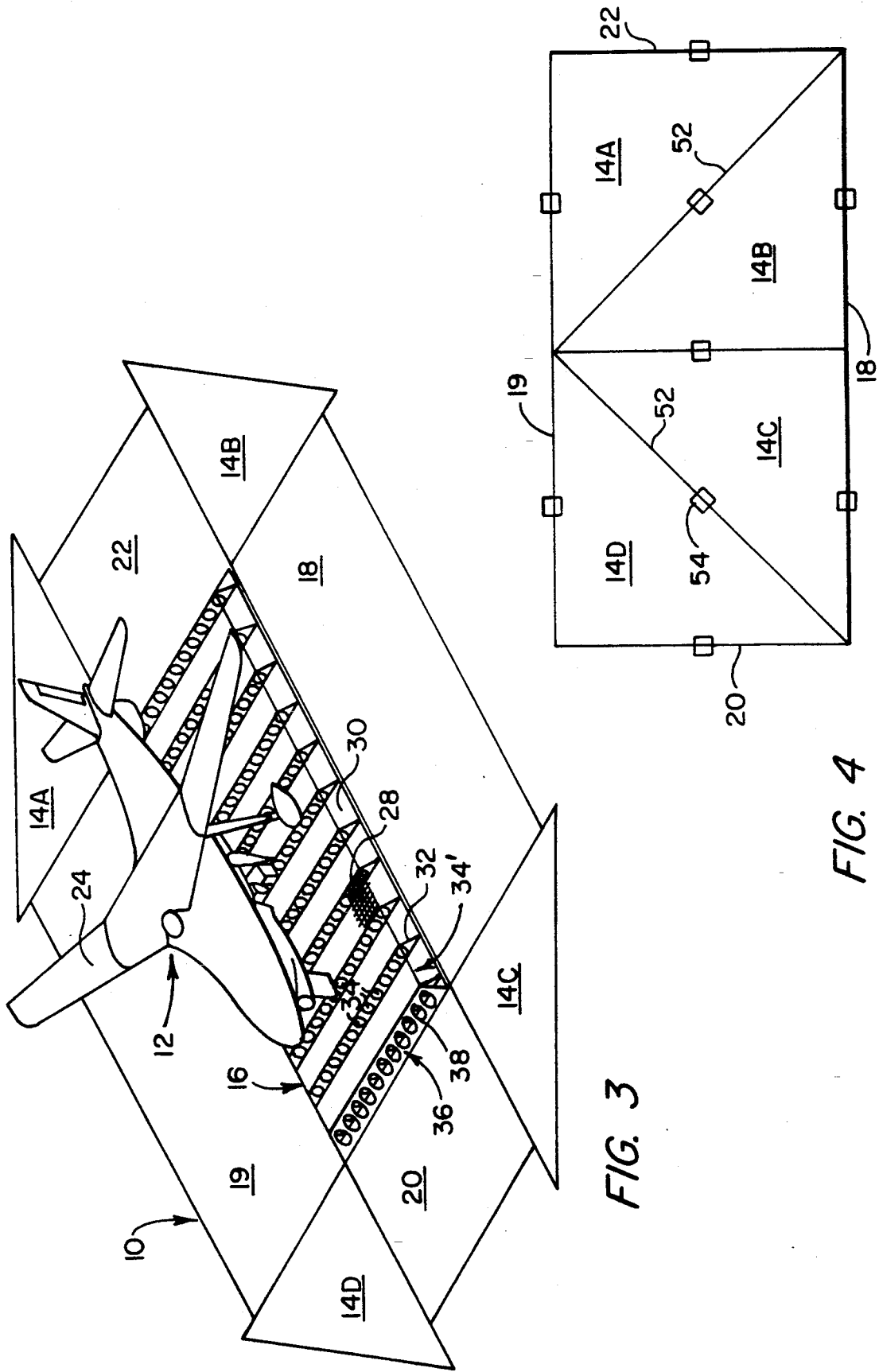
FIG. 3 is a perspective view of the present convertible container in a disassembled condition acting as a deck protector and launch/recovery platform.
FIG. 4 is a schematic illustration of a top plan view illustrating the side-by-side positioning of triangular corner pieces to serve as a cover for a container in accordance with the present invention.

FIG. 3 illustrates the container in a converted condition whereby all of the walls have been folded down against the ship's deck and serve to protect the deck against elevated temperature of VTOL exhaust gases and to eliminate lift engine "suck down" effects. Considering the construction of each of the walls, base 16 is taken as illustrative and is seen to include stiffeners 32 arranged in parallel spaced relationship across the base 16. The lower layer 30 may be a solid steel member or other suitable material such as titanium while the upper layer 28 is seen to be fabricated of a wire mesh material. Holes 34 are formed along the length of each of the stiffeners so as to permit hot gas venting along the entire length of the base 16 as well as in a transverse direction between stiffeners. Thus, a channel 34' is created by adjacent ribs, the mesh layer 28 and the lower layer 30. The channel helps to vent hot exhaust gases away from the aircraft exhaust area. It should be understood that the remaining walls of the container include similar stiffener and layered construction so that continuous transverse channels are formed between aligned stiffeners of the adjacently positioned container wall members. The outermost stiffeners, such as 36 in FIG. 3, actually include a bevel stiffener 38 so that, when the walls become upright, miter edges are formed as clearly shown in FIGS. 1A and 1B of the drawings.

Figure 2:
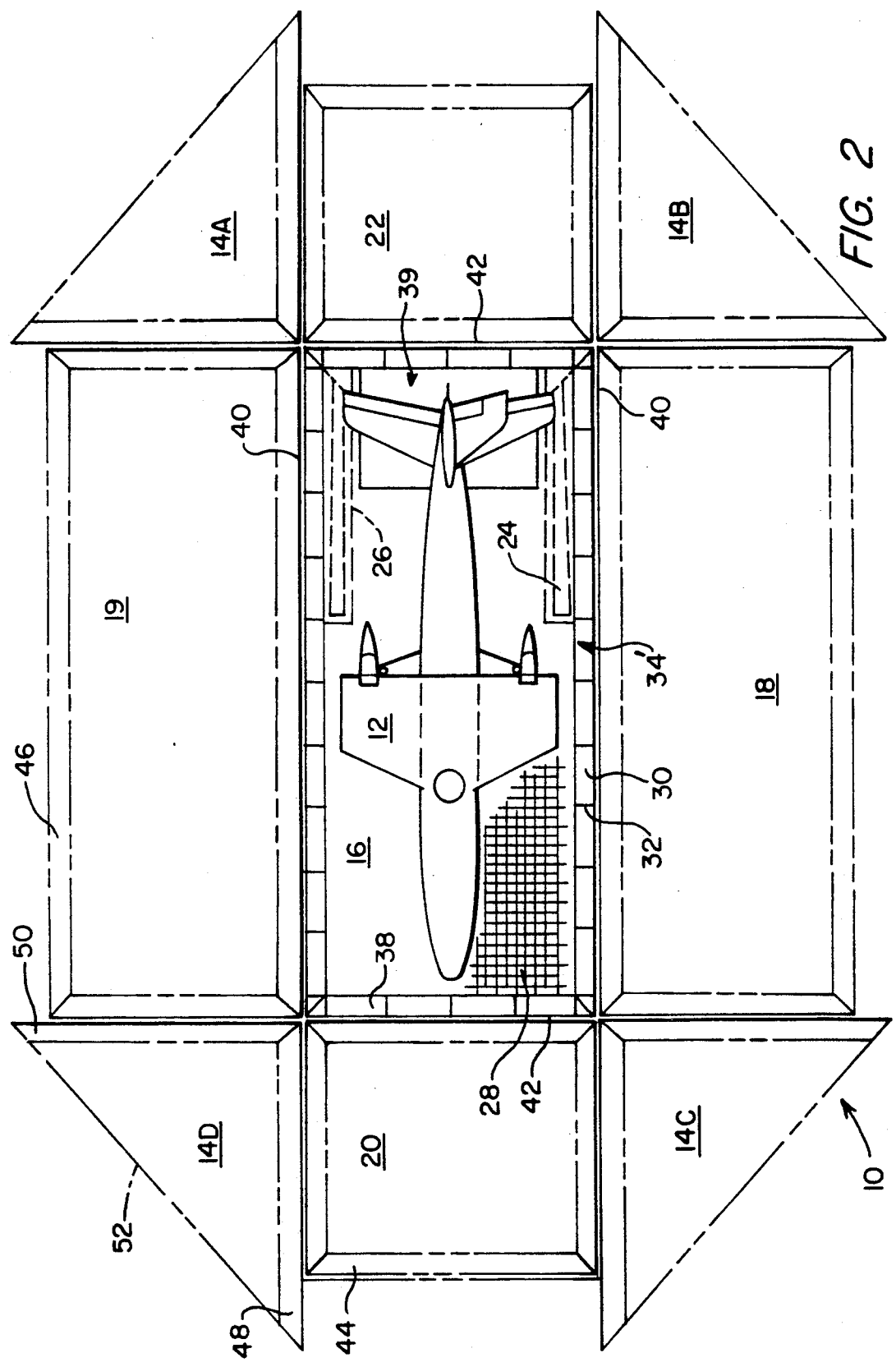
FIG. 2 is a top plan view of the present convertible container in a disassembled condition acting as a deck protector and launch/recovery platform.

FIGS. 2 and 3 indicate four triangular panels 14A, 14B, 14C, and 14D as extending outwardly from the flattened walls when the container is converted to a deck protector. Initially, these triangular panels are secured together to form the cover of the container as shown in FIG. 4. However, when the container is converted as shown in FIGS. 2 and 3, the individual triangular panels are separated as cover pieces and fitted in the corners of the flattened wall members.

FIG. 2 illustrates elongated hinges 40 connecting the base and side walls. Similarly, elongated hinges 42 connect the front and rear walls to the base. Reference numeral 44 in FIG. 2 indicates a beveled edge around the front and back walls of the container while reference numeral 46 indicates a similar beveled edge around the side walls. Each of the triangular panels 14A-14D includes two beveled edges 48 and 50 along the legs of each right triangle panel member. When positioned together as a container cover, as shown in FIG. 4, the non-beveled hypotenuse edges of two contiguous triangular panels (14A, 14B) (14C, 14D) form a diagonal 52 for a square-shaped semi-portion of the cover. Triangular panel edges are appropriately bolted together by conventional fasteners 54. When the container is to be converted to a deck cover, the fasteners are released thereby permitting the removal of the triangular panel members for fitting into the corners of a flattened structure, as shown in FIGS. 2 and 3.

As thus described, the present invention presents a single structure that can be utilized for two important functions in connection with VTOL aircraft. The first function being as a shipping container for the aircraft between a land base and ship board (or on board a vehicle). Second, when the container arrives on board ship, it can be used as a portable hangar and easily disassembled and flattened to serve as a launch/recovery platform and exhaust system for the hot exhaust aircraft gases that might otherwise injure personnel working in proximity to the aircraft during take-off or landing or cause damage to the deck. The wire mesh layer 28 provides an aircraft capture and hold-down capability, used during landing in rough seas. The wire mesh catches a hook or harpoon-type device mounted on the aircraft in a location such as the landing gear, thus preventing the aircraft from bouncing or rolling on or off the deck upon touchdown.

The inventive container system may be fitted with auxiliary apparatus to provide: electric power, air pressure, fire-fighting devices, and other such equipment.

It should be understood that the invention is not limited to the exact details of construction shown and described herein for obvious modifications will occur to persons skilled in the art.

We claim:

1. A convertible shipping container for aircraft comprising:
   a plurality of interconnected walls hingedly connected and unfoldable to mutually coplanar contiguous relation to form a take-off and landing pad;
   stiffeners secured to the walls and positioned in spaced parallel relation to each other;
   the stiffeners having a series of spaced openings therein for venting heated aircraft exhaust gases;
   a top wall of the container comprising a plurality of triangular separable sections of identical shape releaseably fastened in coplanar contiguous relation to form a parallelogram.

2. A convertible shipping container for aircraft comprising:
   a plurality of interconnected walls hingedly connected and unfoldable to mutually coplanar contiguous relation to form a take-off and landing pad;
   stiffeners secured to the walls and positioned in spaced parallel relation to each other;
   the stiffeners having a series of spaced openings therein for venting heated aircraft exhaust gases;
   a top wall of the container comprising a plurality of triangular separable sections of identical shape releaseably fastened in coplanar contiguous relation to form a parallelogram;
   end stiffeners on each wall being beveled to form miter joints between the walls when they are uprighted into a container configuration;
   each wall having a base panel to which the stiffeners are secured; and
   a mesh panel for supporting an aircraft and for passing exhaust gases therethrough for venting longitudinally through the stiffener openings as well as through transverse passageways formed between adjacent stiffeners.

3. A convertible shipping container and portable storage hangar for aircraft adapted to rest on a ship deck and comprising:
   a plurality of interconnected walls hingedly connected and unfoldable to mutually coplanar contiguous relation to form a ship deck heat shield;
   wherein a top wall of the container comprises a plurality of triangular separable sections releaseably fastened in coplanar contiguous relation to form a parallelogram;
   stiffeners secured to the walls and positioned in spaced parallel relation to each other;
   the stiffeners having a series of spaced openings therein for venting heated aircraft exhaust gases;
   end stiffeners on each wall being beveled to form miter joints between the walls when they are uprighted into a container configuration;
   further wherein each wall has
   (a) a base panel to which the stiffeners are secured; and
   (b) a mesh panel for supporting an aircraft and for passing exhaust gases therethrough for venting longitudinally through the stiffener openings as well as through transverse passageways formed between adjacent stiffeners.

4. A method for convertibly crating an aircraft for shipment, the steps comprising:
   placing an aircraft into a container having hingedly connected side and bottom walls;
   covering the open container with a plurality of coplanar contiguous triangular members releaseably secured to each other;
   removing the triangular members upon delivery of the container to a ship deck;
   unfolding the side walls to form a flat continuous heat shield over the deck; and
   placing the individual triangular members in each corner created between edges of adjacent side walls to complete a heat shield for hot aircraft engine exhaust gases.

* * * * *